Patented Aug. 11, 1953

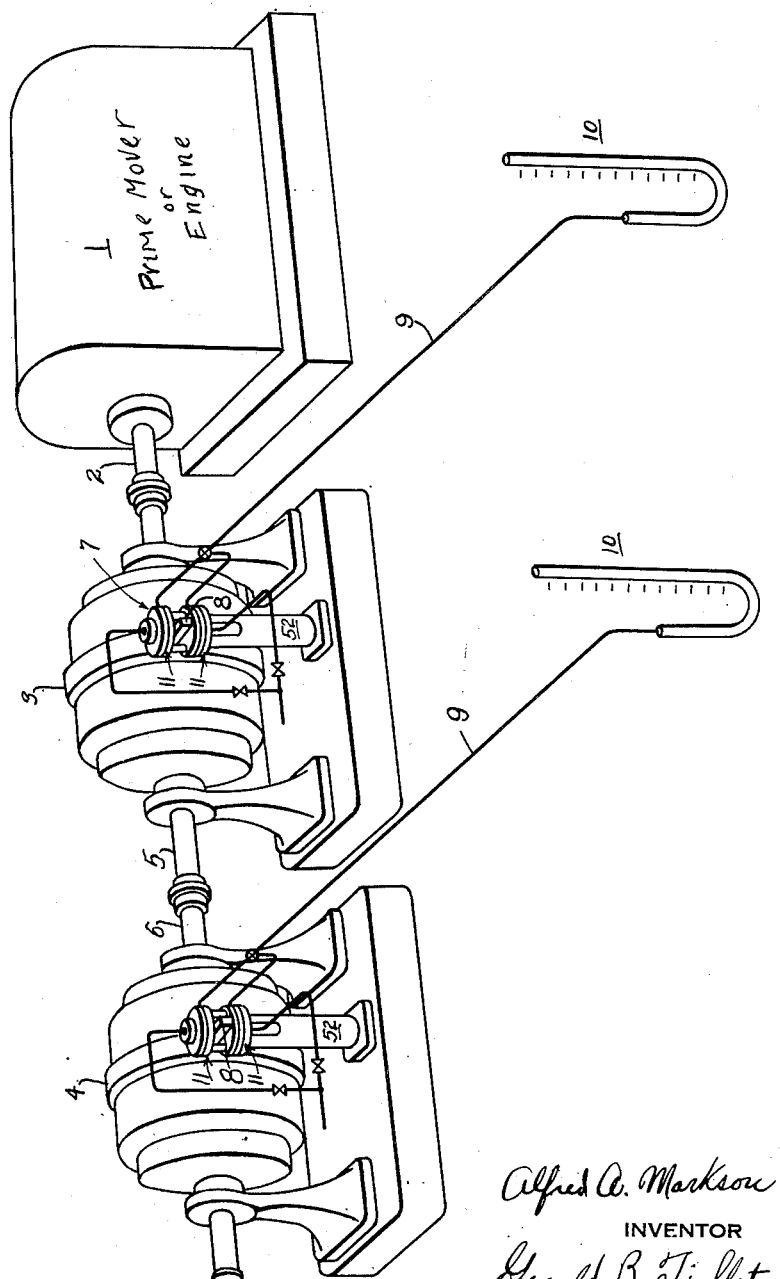

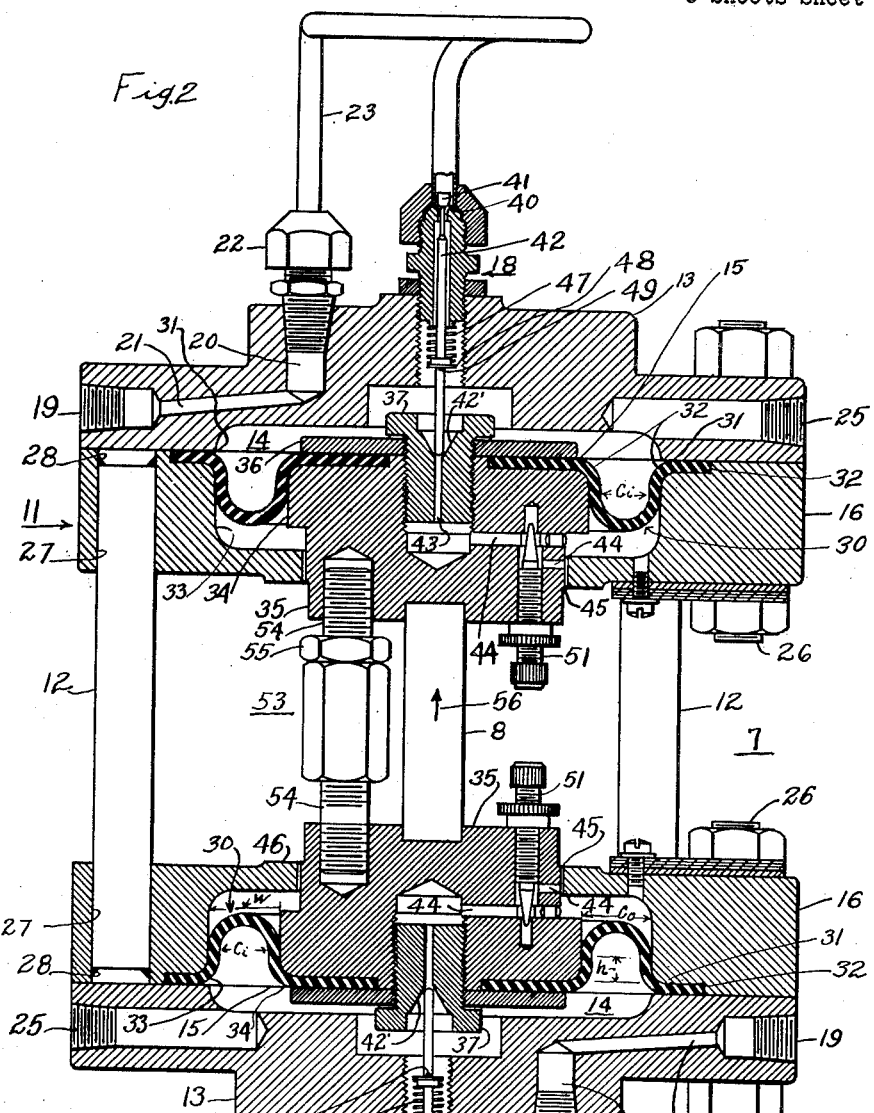

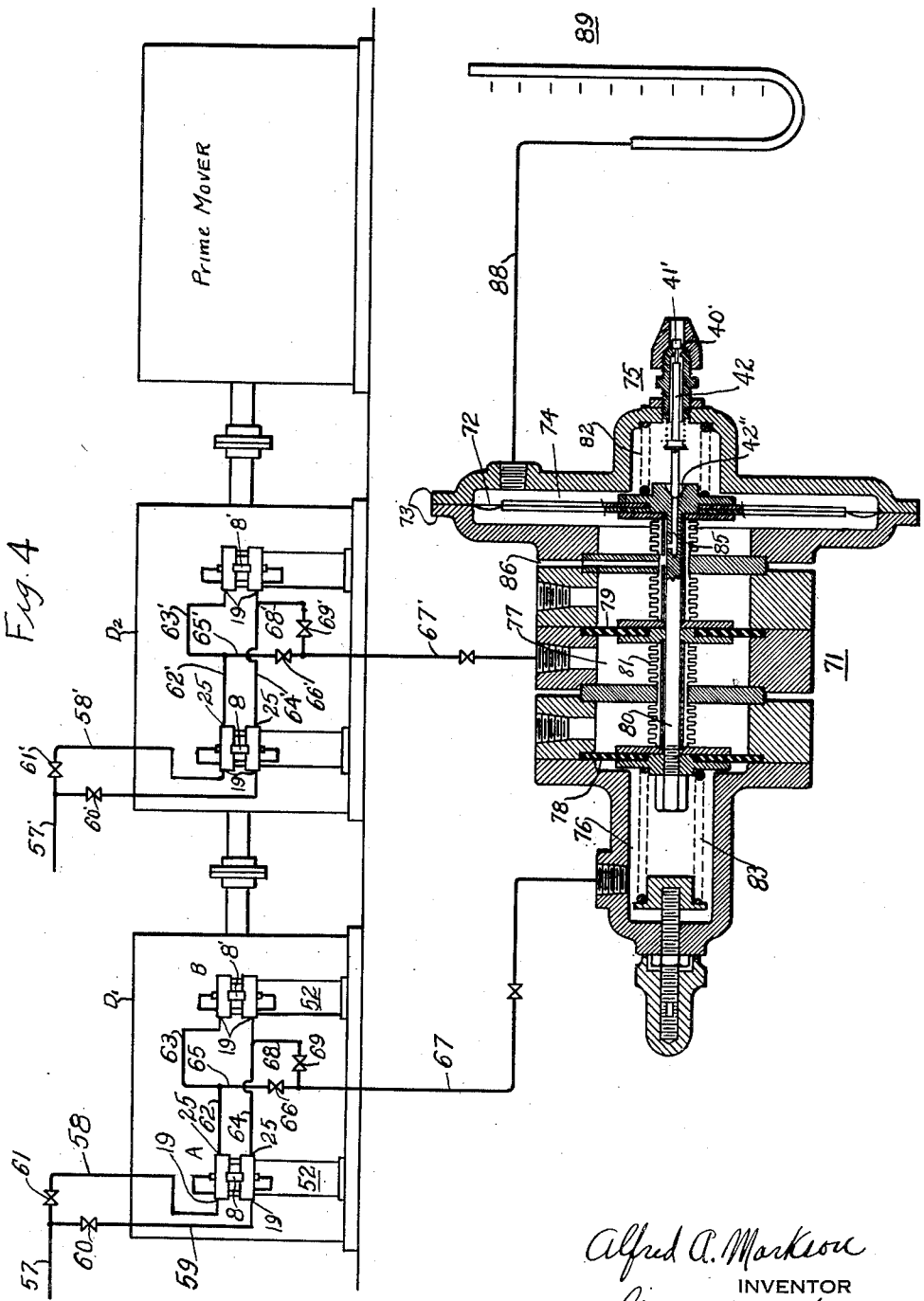

2,648,345

UNITED STATES PATENT OFFICE 2,648,345

VIBRATION DAMPED FORCE MEASURING DEVICE OF THE DIAPHRAGM TYPE PROVIDED WITH A VALVE FOR AUTOMATICALLY APPLYING A PRESSURE TO THE DIAPHRAGM SUFFICIENT TO BALANCE THE FORCE

Alfred A. Markson, Mount Lebanon, Pa., assignor, by mesne assignments, to Hogan Corporation, Pittsburgh, Pa., a corporation of Pennsylvania Application December 14, 1945, Serial No. 634,941

2 Claims. (Cl. 137—85)

This invention relates to measuring devices and more particularly to devices having flexible non-metallic diaphragms for receiving on one side thereof applied forces to be measured, which forces are balanced by means of fluid pressures applied on the opposite sides of such diaphragms, the magnitude of the pressure of such fluids being a measure of the applied forces.

An object of this invention is to provide a device of the character referred to above that is readily adapted to the measurement of applied forces such as the thrust of the torque arm of the dynamometer or other force, in which the force is balanced by a fluid pressure, such as compressed air, for example, which is automatically adjusted in response to deflection of the diaphragm to effect such balance, and wherein the magnitude of pressure of the fluid at the balance point is a direct measure of the force or thrust being measured.

Another object of the invention is to provide a device of the character referred to above in which the diaphragm has a rigid central portion and a pre-formed slack portion between the rim of the diaphragm and the periphery of said central portion, so that the diaphragm has a constant predeterminable effective area in its balanced or neutral position, and a substantially constant slackness ratio for all positions to which the diaphragm is deflected to one side or the other of the balanced position within the operative range of the device.

A still further object of the invention is to provide a device, of the character referred to above, with means whereby the preformed slack portion of the diaphragm may be so confined that the value C in the slackness ratio $S/C$ is held constant. For a definition of slackness ratio $S/C$, see "Report No. 206, Non-Metallic Diaphragms for Instruments," by H. N. Eaton and C. T. Buckingham, National Advisory Committee for Aeronautics.

The aforesaid and other objects of the invention will be readily apparent to those skilled in this art from the following description taken in conjunction with the accompanying drawings in which:

Figure 1 is a more or less diagrammatic view in perspective of a prime mover driving a plurality of dynamometers each of which is provided with a device embodying the invention, for measuring the thrust force of the respective dynamometer torque arms;

Figure 2 is a view in vertical section of the thrust measuring device shown in Figure 1;

Figure 3 is a schematic view of the diaphragm of the device shown in Figure 2; and Figure 4 is a view of apparatus similar to that shown in Figure 1 with the addition of a totalizing device which receives and totalizes the forces corresponding to the thrust forces exerted by torque arms of the several dynamometers.

Throughout the drawings and the specification, like reference characters indicate like parts.

As shown in Fig. 1, a prime mover 1 is arranged to drive through its shaft 2 a plurality of dynamometers 3 and 4, shaft 5 of dynamometer 3 being coupled to shaft 6 of dynamometer 4. Dynamometers 3 and 4 may be assumed to be electrical as these are in common use for testing airplane engines.

Prime mover 1 may be any kind of a prime mover whose power output is to be measured. For example, the prime mover may be regarded as airplane engine. Airplane engines of modern design are capable of developing three thousand or more horsepower. Individual dynamometers as a rule are not built in sizes capable of absorbing that much power and therefore it is customary to employ a plurality of tandem connected dynamometers, the sum of whose capacities is sufficient for the maximum power of the engines being tested. For example, if the engine is capable of developing 3,000 horsepower but the dynamometers available are only capable of absorbing 1,500 horsepower, then by coupling two dynamometers of this capacity in series as are dynamometers 3 and 4, the engine may be loaded to its maximum capacity.

Where a plurality of dynamometers are coupled in series as shown in Fig. 1, then in order to determine how much power the prime mover is developing, means must be provided for each dynamometer to indicate the particular amount of power each one is absorbing. In order to accomplish these measurements on each individual dynamometer, a device 7 is provided for each dynamometer 3 and 4. Device 7 is arranged to measure the torque thrust of the stator of each dynamometer. The thrust of each stator may be applied to its associated device 7 through a torque arm 8.

Generally stated, this device receives the applied thrust torque force and automatically establishes a balancing fluid pressure which acting through a diaphragm balances the force of the torque arm. The pressure required to balance this force may be communicated through a sending line 9 to a manometer 10 which is calibrated in suitable terms, for example in pound feet. If the speed of the dynamometer shaft in R. P. M. is known or measured, then the horsepower output may be computed by any well known formula for computing horsepower when the values of R. P. M. and torque in pound feet are known.

In Fig. 2, device 7 is shown in detail. This device comprises two similar units 11 disposed in opposed spaced relation, being coupled together by means of rigid spacing and supporting struts 12. The torque arm is received between these units and is rigidly coupled to diaphragms thereof. When the dynamometer is rotating in one direction, one of these units 11 measures the torque force and when the dynamometer is rotating in the opposite direction, the other unit measures the torque force. Thus the device shown in Fig. 2 is a double-acting device in which only one of units 11 is operating at any one time.

Since units 11 are similar it will be sufficient to describe only one of them in detail but similar and corresponding parts will be given similar reference characters.

Each device 11 comprises a diaphragm housing member 13 having in one face thereof a cavity or recess 14, a diaphragm 15 disposed across the cavity face of the housing and a ring 16 which clamps the marginal edge of the diaphragm tightly against the housing so that a pressure-tight chamber is formed by the diaphragm and space 14 of the housing. The pressure space 14 is subjected to variable pressures under the control of a valve 18 disposed for actuation by and in response to movements of the diaphragm. The diaphragm housing is provided with tapped hole or opening 19 to which may be connected a source of fluid pressure such as compressed air under constant pressure, a tapped hole 20 which is connected to tapped hole 19 by means of a passageway 21 and a fitting 22 and pipe 23 connected to valve 18 so that the fluid pressure under control of the valve may be admitted to space 14. The valve as will be described more particularly in detail, is provided with an outlet port also whereby when the supply pressure to chamber 14 is cut off, the pressure in this chamber may be reduced when necessary by exhausting to the atmosphere until the pressure in this chamber is reduced to a value sufficient to balance the thrust force applied by the torque arm 8. The diaphragm housing is provided with an outlet 25 that communicates with chamber 14 whereby the pressure in chamber 14 may be transmitted to manometer 10 or to any other pressure measuring device.

Clamping rings 16 are rigidly secured to the diaphragm housing by suitable bolts 26 (only one of which is shown for each unit 11) spaced uniformly around the periphery thereof. These clamping rings are provided with holes 27 for receiving struts 12. These struts are welded at their opposite ends, as indicated at 28, to the rings thereby insuring that units 11 will be held in fixed and spaced relationship to each other.

Diaphragm 15 is a non-metallic diaphragm having a rigid center or central portion 29 of diameter D and a slack portion 30 disposed between said rigid central portion and rim 31 of the diaphragm. Rim 31 may be regarded as that portion of the diaphragm immediately adjacent the marginal portion 32 which is clamped between the diaphragm housing and the clamping ring 16.

Diaphragm 15 is non-metallic and flexible. Preferably it is one made from fabric re-enforced moulded rubber, natural or synthetic. The rubber selected is one which is not appreciably affected by temperature and remains soft and flexible under operating conditions. The slack portion 30 is moulded or formed during the moulding of the diaphragm so that it has predetermined form and dimensions when ready for assembly in units 11. As shown in the drawing, the slack portion is of substantially U-shape in section and forms an annular trough which surrounds and is concentric with the rigid central portion 29 of the diaphragm.

The bottom of the U-shaped channel is preferably substantially semi-circular in form having an outside diameter equal to $C_o$, an inside diameter of $C_i$ and a mean diameter of $C_m$. The sides of the channel extending from the diameter of the semi-circular portion to the rim 31 may be straight and substantially parallel except for the radius portions 33 and 34 that fit over the rounded corners of the ring 16 and the rigid center. The slackness ratio of the slack portion may be regarded as the ratio of the sum of the mean length of the straight side portions and the mean length of the semi-circular portion to $C_m$. The length of the slack portion may be called $S_m$. The mean length of the semi-circular portion may be expressed as $$\frac{\pi C_m}{2}$$

and the length of each side may be expressed as $h$; therefore the length of the slack portion is $$\frac{\pi C_m}{2}+2h$$

The slackness ratio may be expressed therefore as $$\frac{\frac{\pi C_m}{2}+2h}{C_m}=\frac{\pi C_m+4h}{2C_m}$$

As shown, depth of the slack portion is equal to $$\frac{C_m}{2}+h$$

but this depth may vary from a value $$\frac{C_m}{2}$$

to a value $$\frac{C_m}{2}+h$$

therefore the range of the slackness ratio may be expressed as being within the values $$\frac{\pi}{2} \text{ to } \frac{\pi C_m+4h}{2C_m}$$

The effective diameter of the diaphragm is equal to the diameter D of the rigid central portion plus $C_m$ or as shown in Fig. 3.

When the diaphragm is in its neutral position, the force exerted on it by the pressure in chamber 14 balances the force applied by torque arm 8 to the opposite side of the diaphragm. When the force applied through the torque arm increases or decreases with respect to the balancing pressure, the diaphragm will deflect in one direction or the other, i. e. in the direction of force preponderance and actuate valve 18 whereby the pressure in chamber 14 is changed to a value at which the force exerted by such pressure balances the force applied to the diaphragm by the torque arm. When balance occurs, the diaphragm is in its neutral or balanced position.

In order that the effective area of the diaphragm may be maintained constant when the diaphragm is shifted out of its neutral position and also to insure that the effective diameter $D_E$ of the diaphragm will remain constant when in its neutral position throughout the entire operating pressure range of the device, means are provided for confining the slack portion 30 of the diaphragm to a space such that the mean width $C_m$ of the slack portion remains constant. In order to confine slack portion 30 in this manner, ring 16 is made or formed with a straight side wall which is concentric with the center of the diaphragm, and the rigid center is provided with straight side wall 34 which is also concentric with the center of the diaphragm, thereby providing an annular space whose radial width is equal to the outside diameter $C_o$ of the semi-circular portion of the diaphragm.

The rigid center of the diaphragm is formed by means of a thrust plate 35 having a diameter D and which bears against the outer face of the central portion of the diaphragm, a backing plate 36 which bears on the inner central portion of the diaphragm and a clamping bolt 37 which extends through the backing plate and into the thrust plate. Bolt 37 has screw thread engagement with member 35 whereby it may be drawn up tightly to clamp the central portion of the diaphragm firmly between the thrust and backing plates. The width of the annular space between thrust plate 35 and clamping ring 16 is such that the preformed slack portion fits snugly into it and so that the sides thereof hug the side walls of the ring and the thrust plate 35 respectively. This form of construction gives added strength to the diaphragm in that it is less likely to rupture at or near radius points 33 and 34 because the straight portions "$h$" tend to grip the sides of the ring and the thrust plate in such manner as to distribute the tension forces in the diaphragm. This results in lower unit tension forces at any particular point.

As may be observed by inspection of Fig. 2, it will be apparent that the effective diameter $D_e$ will be the same for any position of the central portion of the diaphragm above or below its neutral or balanced point and that since this effective diameter remains constant, the effective area of the diaphragm also remains constant. When the diaphragm is in its neutral position also the measuring position, the slack portion of the diaphragm is in its neutral or preformed state, an important factor in the accuracy of the device.

Valve 18 is arranged to be actuated by and in accordance with the deflection of the central portion of diaphragm 15, resulting from a difference between the force applied to the thrust plate 35 by the torque arm 8 and the force of the pressure acting on the diaphragm in opposition thereto.

Valve 18 is of the poppet type and comprises a valve body 39 which is threaded into an opening in the top of the diaphragm housing. This opening is centered with the center of the diaphragm. The valve body is provided with an inlet seat 40 which is opened or closed by means of a valve element 41 carried by a valve stem 42 extending longitudinally through the valve body. The lower end of this valve stem seats in a valve seat 42' formed in the clamping bolt 37. The clamping bolt is provided with a central bore or passageway 43. This passageway and a lateral passageway 44 in member 35 allows fluid pressure to be discharged into space 45 and the atmosphere space 45 being between an inwardly projecting flange 46 of ring 16 and the adjacent wall of thrust plate 35.

Valve stem 42 is provided with a light compression spring 47 disposed between the bottom of valve body 39 and a collar 48 supported on a pin 49 extending through the stem. This spring, as stated, is preferably of light construction and is employed to urge the valve stem towards the position in which inlet 40 is closed.

In order to minimize the tendency of vibration of the diaphragm 15 means may be provided for adjustably restricting the discharge passageway 44. A convenient way of providing an adjustable restriction is the employment of a needle valve such as indicated at 51. In a structure such as shown, a poppet type valve is desirable because of its direct coupling to the diaphragm and the small lift or travel required to effect pressure adjustments in pressure chamber 14. However, such a valve and diaphragm system have a tendency to vibrate and render the device inaccurate particularly where a high degree of accuracy in the measurement of the power output of a prime mover and variations in such output is desired. The needle valve restriction provides a means for damping this tendency to vibrate.

Device 7 shown in Fig. 2 is mounted on a post or pedestal 52 on the bed of the dynamometer. When so mounted, the torque arm 8 extends between the thrust receiving members 35. In order to secure the thrust members 35 to the torque arm in a rigid manner, turn buckles 53 are provided. Each turn buckle includes a pair of stud bolts 54 and a lock nut 55. The stud bolts are threaded into the respective thrust members 35 in alined relationship after which the turnbuckle is drawn up to the required tension. By means of these turn-buckles, only one of which is shown in Fig. 2, the thrust members 35 may be adjusted with respect to each other so that when the thrust members are rigidly attached to the torque arm, the valve stems of the two units will occupy their proper positions. In other words, when properly adjusted to the torque arm, the valves will be in their closed positions when the diaphragms are in their neutral positions.

If it be assumed that only the upper unit 11 is operating, in which case the direction of the force applied by torque arm 8 will be in the direction of arrow 56, and that this force is increasing from say zero value to a maximum value then as this force increases progressively to higher and higher values, the pressure in chamber 14 will increase likewise. Thus, if the force applied by arm 8 increases from zero to a value of A pounds—assuming the torque force is converted to a value corresponding to a force acting on a torque arm of unit length—diaphragm 15 will deflect upwardly lifting valve element 41 off the inlet seat (the exhaust port seat being closed under the assumed direction of deflection of the diaphragm) allowing the pressure in chamber 14 to build up until the force exerted by that pressure equals the applied force A. When this happens the diaphragm will be in neutral position. If after a balance has been established, the applied thrust force decreases, diaphragm 15 will deflect in a direction to open exhaust seat 42', and cause the pressure acting in chamber 14 to decrease until the pressure force on the diaphragm balances the applied torque force, at which time the diaphragm will be in neutral position, and both valve ports are closed.

In Fig. 4, a prime mover is illustrated which may be assumed to be of large horsepower capacity requiring several dynamometers $D_1$ and $D_2$ of large capacities. The capacities of these dynamometers may be such that the maximum thrust forces exceed the range of a single device such as shown in Fig. 2. In such a case, either the device must be made with specially large diaphragms or two or more devices may be utilized. Where two or more of these devices are utilized, the total of the balancing forces developed by them are additive. In Fig. 4, two thrust measuring devices located at A and B are shown for each dynamometer, the latter having two torque arms 8 and 8'.

When such an arrangement is employed, only one of the devices is provided with a control valve 18 for establishing the balancing pressures. The device at A may be regarded as the one having a valve 18, this valve being removed from the device at B. The balancing pressures established by valve 18 of the device at A are transmitted to the pressure chamber of the device at B.

As indicated in Fig. 4, device A is like the one shown in Fig. 2, and is provided with a control valve 18. Device B is in all respects like the device at A except that the control valve is omitted, i. e. the valve stem 42 is omitted and a solid bolt substituted for bolt 37, i. e. the bolt does not have a valve seat 42' and a discharge passageway 43 therein.

The piping of fluid pressure for the devices at A and B is the same for the thrust measuring devices applied to both dynamometers. For dynamometer $D_1$, there is a supply pipe 57 having branches 58 and 59 with valves 60 and 61 in the respective branches. Branch 58 is connected to port 19 of the upper torque measuring unit and branch 59 to the corresponding port in the lower unit.

The sending port 25 of the upper unit is connected by pipes 62 and 63 to the supply port 19 of the upper unit of the device at B, and the sending port 25 of the lower unit of A is connected to the supply port 19 of the lower unit of B by pipe 64. Branch pipes 62 and 63 are connected by a pipe 65 having a valve 66 therein, to a sending pipe 67 and pipe 64 is connected to pipe 67 by a pipe 68 having a valve 69 therein.

When the upper units of A and B are operating, the torque thrust of the dynamometers then being in the direction of arrow 56, valves 60 and 69 are closed and valves 61 and 66 are opened. Under these conditions whatever pressure is established in diaphragm chamber 14 of the upper unit of the device at A will be transmitted to and maintained in the diaphragm chamber of the corresponding unit of the device at B.

The torque thrust measuring devices applied to dynamometer $D_2$ are arranged for operation in the same manner as those above described in connection with dynamometer $D_1$. Therefore, similar or corresponding parts are designated by the same reference characters with primes affixed thereto.

In order to totalize the thrust forces of the two dynamometers and make it possible to read the total output of the engine by the indicating instrument or device, a totalizer 71 is provided. Totalizer 71 receives the pressures sent out by the torque measuring devices at A and B of dynamometers $D_1$ and $D_2$ through pipes 67 and 67'. The totalizer comprises a diaphragm 72 mounted in a housing 73 to form a pressure chamber 74 under the control of a poppet valve 75 such as valve 18 described in connection with the device of Fig. 2. Since poppet valve 75 operates in the same manner as valve 18, similar and corresponding parts will be indicated by the same reference characters with primes affixed. The totalizer includes also a plurality of pressure receiving chambers 76 and 77 in which diaphragms 78 and 79 are disposed. Chamber 76 receives pressure from pipe 67 and chamber 77 receives pressure from pipe 67'. Diaphragms 78 and 79 are connected through a push rod 80 to diaphragm 72, and the respective diaphragms are sealed from each other by means of flexible seals 81. If desired a relatively strong compression spring 82 may be placed in chamber 74 to act against diaphragm 72 and an adjustable opposing spring 83 may be placed in chamber 76. The forces exerted by the pressures on the respective diaphragms 78 and 79 act towards the right as seen in Fig. 4, whereas the force exerted by diaphragm 72 acts in opposition to these forces namely to the left as seen in Fig. 4. When the torque force pressures in pipes 67 and 67' are increasing, the totalizer diaphragms 78 and 79 are flexed towards the right as seen in Fig. 4, causing the poppet valve to open its inlet port 40' and allow the pressure from a supply source to enter chamber 74. The pressure will build up in this chamber until the force exerted by it balances the forces exerted by the pressures in chambers 76 and 77 on diaphragms 78 and 79. When these forces are in balance, the poppet valve is returned to neutral position in which both the inlet and exhaust port thereof are closed. The exhaust port 42'' is arranged to discharge pressure from the pressure chamber through passageways 85 and 86 to the atmosphere. Therefore when there is a reduction in pressure in chambers 76 and 77, diaphragm 72 flexes to the left, the exhaust port of valve 75 being thereby opened and the pressure in chamber 74 reduced until the forces acting on the diaphragms again are balanced and the valve returned to neutral.

As is shown in Fig. 4, the balancing diaphragm 72 is substantially larger in area than the area of diaphragms 78 and 79. Thus, for example, if the balancing diaphragm is considered to have an effective area of 2A and each of diaphragms 78 and 79 to have an effective area of 1A, then the range in the value of the pressures acting in chambers 76 and 77 can be the same as that supplied to chamber 74. Thus if the pressure range for chambers 76 and 77 is from say zero pounds gauge to 60 pounds per sq. in. gauge, then the range of balancing pressures for the balancing diaphragm 72 will also vary from zero pounds gauge to 60 lbs./sq. in./gauge.

The balancing pressure established in chamber 74 may be transmitted through pipe 88 to a pressure indicating device 89 such as a manometer which is calibrated in terms suitable for the measurements being made. Thus, for example, the manometer may be calibrated in terms of torque expressed in pound feet or in pounds if converted to a ratio corresponding to that which is obtained with a torque arm whose length is one foot. The totalizing arrangement shown in Fig. 4 may also be applied to that shown in Fig. 1.

When the dynamometers shown in Fig. 4 are driven in a direction opposite to that assumed above, then valves 61 and 66 are closed and valves 60 and 69 are opened, to put the bottom units of devices A and B in operating condition for measuring the thrust exerted by the torque arms thereon.

Having thus described the invention and its application to the measurement of thrust forces such as are developed by dynamometers, it will be apparent to those skilled in this art that various modifications and changes may be made without departing either from the spirit or the scope of the invention.

What I claim as new and desire to secure by Letters Patent is:

1. A device adapted to measure thrust forces comprising a pair of opposed housing members, a flexible non-metallic diaphragm between said members having its peripheral edge clamped therebetween, said diaphragm having an annular U-shaped trough concentric with and adjacent to the clamped edge of the diaphragm, one of said members having a poppet valve mounted thereon adapted to supply a pressure fluid into the space between said one housing member and said diaphragm, a sending port communicating with said space adapted for connection to a pressure measuring device, the other of said housing members having an opening therein which is concentric with the center of said diaphragm, a thrust member disposed in said opening and bearing against the diaphragm on the face opposite the pressure face thereof, a clamping plate concentric with the center of said diaphragm and bearing against the diaphragm on its pressure face in the area opposite that of the thrust member, the opposite walls of the U-shaped trough in said diaphragm engage the adjacent walls of the housing and thrust member, the width of said trough being equal to C and having a slack length S, the engaging walls of said housing and thrust member so confining the width of the trough that the ratio of slack length S to width C is substantially constant for all values of thrust and balancing pressure on said diaphragm, a screw threaded member extending through said plate and diaphragm and having screw thread engagement with the thrust member for clamping the central portion of said diaphragm between said thrust member and said plate, a valve seat in said threaded member, said threaded member having a discharge passageway therein, said thrust member having a discharge passageway leading to the atmosphere and communicating with the passageway in said threaded member, a valve stem in said valve having one end controlling said discharge valve seat, there being a part on said stem adjacent the other end thereof for controlling the inlet of said poppet valve, and means for securing the thrust member to a thrust force transmitting member whose thrust force is to be measured, the thrust transmitting member acting to flex said diaphragm when the thrust force and the force of pressure acting thereon are out of balance and to so operate said valve, by opening its inlet valve while holding the exhaust port closed and vice versa, that the force of the pressure acting on the pressure face of said diaphragm always balances the thrust force to be measured, said inlet and exhaust ports of said valve being closed when said thrust and pressure forces are in balance, means for adjustably restricting the discharge passageway in said thrust member.

2. Double acting force measuring apparatus comprising a pair of force measuring devices mounted in spaced relation to each other, each device comprising a pair of housing members having a space therebetween for receiving a flexible diaphragm, the peripheral edge of said diaphragm being clamped between said housing members whereby the space between one face of said diaphragm and its housing member forms a pressure chamber, the opposed housing members of each device being provided with an opening concentric with the center of said diaphragm, a thrust member extending through each of said openings and being secured to said diaphragms respectively, means adjustably secured to said thrust members for securing the same to a common force transmitting member, a valve for each device each said valve being disposed for actuation by its associated diaphragm, each valve having an inlet port seat disposed to admit fluid pressure to said chamber, each thrust member having an outlet valve seat therein providing communication between said space and the atmosphere, and a valve stem in each valve disposed to engage and close both said inlet and exhaust ports when the respective diaphragms are in neutral position and in balance with the force of the pressures and the thrust force acting thereon, said valve stem acting to open the inlet port while the exhaust port is closed and vice versa as the diaphragm is flexed in one direction or the other from neutral in response to an unbalance between said forces of pressure and thrust, each device having a sending port from which the pressure acting on its diaphragm may be transmitted to a force indicating device, one of said devices being disposed to measure thrust forces acting in one direction and the other to measure thrust forces in the opposite direction, and a needle valve in each of said exhaust passageways arranged to throttle the rate at which pressure medium is exhausted from the associated pressure space of said device thereby to minimize vibration of said diaphragms.

ALFRED A. MARKSON.

References Cited in the file of this patent

UNITED STATES PATENTS

| Number | Name | Date |
|---|---|---|
| 1,914,600 | Hewett | June 20, 1933 |
| 2,013,810 | Shimek | Sept. 10, 1935 |
| 2,241,056 | Chilton | May 6, 1941 |
| 2,275,712 | Zand | Mar. 10, 1942 |
| 2,286,282 | Joesting | June 16, 1942 |
| 2,304,782 | Donaldson | Dec. 15, 1942 |
| 2,304,783 | Donaldson | Dec. 15, 1942 |
| 2,356,970 | Brockett | Aug. 29, 1944 |
| 2,380,858 | McMahon | July 31, 1945 |
| 2,411,747 | Nelson | Nov. 26, 1946 |
| 2,493,012 | Moore | Jan. 3, 1950 |
| 2,593,906 | Markson | Apr. 22, 1952 |